US008467332B2

(12) United States Patent
Yamaura

(10) Patent No.: US 8,467,332 B2
(45) Date of Patent: Jun. 18, 2013

(54) INFORMATION RECEIVING APPARATUS AND INFORMATION TRANSMITTING APPARATUS

(75) Inventor: Tomoya Yamaura, Tokyo (JP)

(73) Assignee: Sony Corporation (JP)

( * ) Notice: Subject to any disclaimer, the term of this patent is extended or adjusted under 35 U.S.C. 154(b) by 301 days.

(21) Appl. No.: 12/734,711

(22) PCT Filed: Sep. 16, 2009

(86) PCT No.: PCT/JP2009/066176
§ 371 (c)(1),
(2), (4) Date: May 18, 2010

(87) PCT Pub. No.: WO2010/044328
PCT Pub. Date: Apr. 22, 2010

(65) Prior Publication Data
US 2010/0254368 A1 Oct. 7, 2010

(30) Foreign Application Priority Data
Oct. 14, 2008 (JP) .............................. P2008-264837

(51) Int. Cl.
*H04B 7/212* (2006.01)
(52) U.S. Cl.
USPC ......................................... 370/321; 370/442
(58) Field of Classification Search
USPC .................. 370/321, 337, 347, 442
See application file for complete search history.

(56) References Cited

U.S. PATENT DOCUMENTS

| 6,430,172 | B1 | 8/2002 | Usui et al. |
| 7,499,425 | B2 | 3/2009 | Yew et al. |
| 7,664,089 | B2 | 2/2010 | Zhao |
| 2003/0179301 | A1* | 9/2003 | Feldis et al. ................ 348/231.3 |
| 2006/0072627 | A1 | 4/2006 | Kugumiya et al. |
| 2007/0100473 | A1* | 5/2007 | Shvodian et al. ................ 700/19 |
| 2008/0062880 | A1 | 3/2008 | Yew et al. |
| 2008/0063216 | A1 | 3/2008 | Sakata et al. |
| 2008/0080516 | A1* | 4/2008 | Sammour et al. ............. 370/394 |
| 2009/0103892 | A1* | 4/2009 | Hirayama et al. ................ 386/83 |
| 2009/0147803 | A1* | 6/2009 | Takayama ..................... 370/475 |
| 2009/0196282 | A1* | 8/2009 | Fellman et al. ................ 370/352 |

FOREIGN PATENT DOCUMENTS

| JP | 11-074886 A | 3/1999 |
| JP | 2005-244819 A | 9/2005 |
| JP | 2006-109000 A | 4/2006 |
| JP | 2008-072736 A | 3/2008 |
| JP | 2008-092546 A | 4/2008 |
| JP | 2008-172763 A | 7/2008 |

* cited by examiner

*Primary Examiner* — Phuc Tran
(74) *Attorney, Agent, or Firm* — Lerner, David, Littenberg, Krumholz & Mentlik, LLP

(57) ABSTRACT

A transmitting apparatus sequentially transmits a wireless packet PK1 for data streaming transmission with a non-transmission period therebetween to a receiving apparatus. A predetermined proportion of non-transmission periods are assigned to a period for transmitting a wireless packet PK2 for control information transmission from the information receiving apparatus to the information transmitting apparatus. The wireless packets PK1, PK2 contain time-position information indicating a second non-transmission period that is not assigned to the transmission from the receiving apparatus to the transmitting apparatus. The receiving apparatus and another transmitting apparatus different from the transmitting apparatus transmitting the wireless packet PK1 can identify the time position of the second non-transmission period by the time-position information contained in the wireless packets PK1, PK2, and can communicate to each other during the second non-transmission period.

19 Claims, 10 Drawing Sheets

SET-TOP BOX (SOURCE DEVICE)

INFORMATION RECEIVING APPARATUS AND INFORMATION TRANSMITTING APPARATUS

CROSS-REFERENCES TO RELATED APPLICATIONS

The present application is a national phase entry under 35 U.S.C. §371 of International Application No. PCT/JP2009/066176 filed Sep. 16, 2009, published on Apr. 22, 2010 as WO 2010/044328 A1, which claims priority from Japanese Patent Application No. JP 2008-264837 filed in the Japanese Patent Office on Oct. 14, 2008.

BACKGROUND OF THE INVENTION

Technical Field

This invention relates to an information receiving apparatus and an information transmitting apparatus.

For example, as described in Patent Document 1 and the like, there is a growing demand for wireless streaming transmission of video signals between a source device such as disk recorder or terrestrial digital broadcasting tuner and a sink device such as television receiver.

Also, as the devices have become digitalized and the interfaces sophisticated, the simplification of the user interfaces has been attempted. One example of the suggestions is one-touch playback in which, when the playback button on the source device is pressed, the input of the sink device is automatically switched to display on the sink device a picture of a video signal from the source device.

Considering the connection with a plurality of source devices, the sink device is desirably the master station of a wireless network to manage resources. However, this makes it difficult for the sink device to change the wireless resource assignment immediately when the amount of stream data generated by the source device to be transmitted has changed. For example, when a normal program is in 1080p format and a commercial is in 1080i format, the amount of data to be transmitted per unit of time changes by a factor of two.

Then, a configuration may be possible in which the source device is the master station of the wireless network to determine the wireless resource assignment. However, in this configuration, even if two or more source devices exist, the wireless resource is substantially occupied by one source device and one sink device. So it is impossible for the source device to wirelessly transfer control information from another source device to the sink device or wirelessly transfer control information from the sink device to another source device that is currently not in communication with the source device.

FIG. 13 shows a configuration example of an information communication system 200. The information communication system 200 includes an information transmitting apparatus (source device) 210 such as disk recorder or set-top box and an information receiving apparatus (sink device) 220 such as television receiver. Wireless communication is performed between the information transmitting apparatus 210 and the information receiving apparatus 220.

From the information transmitting apparatus 210 to the information receiving apparatus 220, a wireless packet PK1 for data streaming transmission is sequentially transmitted with a non-transmission period therebetween, as shown in FIG. 14(a). This wireless packet PK1 contains streaming data of audio and video as well as various control information.

On the other hand, from the information receiving apparatus 220 to the information transmitting apparatus 210, a wireless packet PK2 for control information transmission is sequentially transmitted during the non-transmission period, according to the control information contained in the wireless packet PK1, as shown in FIG. 14(b). This wireless packet PK2 contains control information such as ACK (ACKnowledgement).

RELATED ART DOCUMENT

Patent Document

Patent Document 1: JP-A-2006-109000

DISCLOSURE OF THE INVENTION

Problems to be Solved by the Invention

For the information communication system 200 shown in FIG. 13, when another information transmitting apparatus different from the information transmitting apparatus 210 in communication with the information receiving apparatus 220 needs to transmit some information to the information receiving apparatus 220, or when the information receiving apparatus 220 needs to transmit some information to the another information transmitting apparatus, there is no time for the transmission. In short, the information receiving apparatus 220 is not able to communicate with the another information transmitting apparatus.

It is an object of this invention to allow an information receiving apparatus receiving a wireless packet for data streaming transmission from an information transmitting apparatus to communicate with another information transmitting apparatus.

SUMMARY OF THE INVENTION

Means for Solving the Problems

One aspect of the present invention provides an information receiving apparatus including:

a wireless transceiver for transmitting and receiving a wireless packet;

a packet generator for generating a wireless packet to be transmitted by the wireless transceiver; and a controller for controlling the wireless transceiver and the packet generator, in which the wireless transceiver receives a first wireless packet for data streaming transmission sequentially transmitted by a first information transmitting apparatus with a non-transmission period therebetween, the first wireless packet containing time-position information indicating the non-transmission period that is not assigned to the transmission from the information receiving apparatus to the first information transmitting apparatus, and in which the packet generator generates a second wireless packet for control information transmission transmitted to the first information transmitting apparatus by the wireless transceiver, the second wireless packet containing time-position information indicating the same non-transmission period that the time-position information contained in the first wireless packet received by the wireless transceiver indicates.

Another aspect of the present invention provides an information transmitting apparatus including:

a wireless transceiver for transmitting and receiving a wireless packet;

a packet generator for generating a wireless packet to be transmitted by the wireless transceiver; and a controller for controlling the wireless transceiver and the packet generator, in which, based on time-position information contained in a wireless packet received by the wireless transceiver from an information receiving apparatus, the controller determines when the wireless transceiver transmits a wireless packet to the information receiving apparatus.

In the invention, a first wireless packet for data streaming transmission is sequentially transmitted with a non-transmission period therebetween from the information transmitting apparatus (source device) to the information receiving apparatus (sink device). Here, a predetermined proportion of non-transmission periods are assigned to a period for transmitting a second wireless packet for control information transmission from the information receiving apparatus to the information transmitting apparatus. The second wireless packet for control information transmission is transmitted from the information receiving apparatus to the information transmitting apparatus during a first non-transmission period that is assigned to the transmission from the information receiving apparatus (sink device) to the information transmitting apparatus.

The first wireless packet transmitted from the information transmitting apparatus to the information receiving apparatus contains time-position information indicating a second non-transmission period that is not assigned to the transmission from the information receiving apparatus to the information transmitting apparatus. The second wireless packet transmitted from the information receiving apparatus to the information transmitting apparatus contains time-position information indicating the same non-transmission period that the time-position information contained in the first wireless packet indicates.

For example, the wireless transceiver of the information receiving apparatus enters receiving mode during the second non-transmission period. This allows the information receiving apparatus to receive a wireless packet (information) transmitted during the second non-transmission period by another information transmitting apparatus different from the information transmitting apparatus transmitting the first wireless packet.

Also, for example, when the information receiving apparatus needs to transmit a predetermined information to another information transmitting apparatus different from the information transmitting apparatus transmitting the first wireless packet, the wireless transceiver of the information receiving apparatus transmits the wireless packet (the predetermined information) to the another information transmitting apparatus without entering the receiving mode during the second non-transmission period. This allows the information receiving apparatus to transmit information to the another information transmitting apparatus.

As described above, the second non-transmission period that is not assigned to the transmission from the information receiving apparatus to the information transmitting apparatus exists, and the second wireless packet transmitted from the information receiving apparatus to the information transmitting apparatus contains the time-position information indicating the second non-transmission period. Then, the information receiving apparatus can transmit/receive information to/from another information transmitting apparatus different from the information transmitting apparatus transmitting the first wireless packet, which improves user convenience. For example, when a control information notifying the switching of streaming transmission is transmitted from the another information transmitting apparatus to the information receiving apparatus, the streaming transmission can be switched without causing a user of the information receiving apparatus to notice the switching of information source of the streaming transmission.

For example, in the information transmitting apparatus, when the amount of information to be transmitted for data streaming transmission increases or the transmittable bit rate decreases after the first wireless packet containing the time-position information is transmitted by the wireless transceiver, the information contained in the first wireless packet is adjusted so as not to cause the time position of the second non-transmission period to vary. For example, a transmission bit of low importance is thinned out, or the transmission of a portion of information that is not sensitive to a variation in transmission delay, such as an instruction asking for information on communication quality, is postponed.

Also, for example, in the information transmitting apparatus, when the amount of information to be transmitted for data streaming transmission decreases or the transmittable bit rate increases after the first wireless packet containing the time-position information is transmitted by the wireless transceiver, at least, the information contained in the first wireless packet is adjusted or the timing of transmitting the first wireless packet is adjusted so as not to cause the time position of the second non-transmission period to vary. For example, the redundancy of transmission bits is increased, or a portion of information that is not sensitive to a variation in transmission delay planned to be transmitted by the next wireless packet is contained in the current wireless packet. Also, for example, the timing of transmitting the first wireless packet is kept no change even when the time length of the first wireless packet decreases.

As described above, the time position of the second non-transmission interval is prevented from varying when the amount of information to be transmitted for data streaming transmission increases or the transmittable bit rate decreases, or when the amount of information to be transmitted for data streaming transmission decreases or the transmittable bit rate increases. Thus, the transmission/reception of information between the information receiving apparatus and the another information transmitting apparatus can avoid being interfered by the transmission of the first wireless packet.

For example, the time-position information contained in the second wireless packet transmitted from the information receiving apparatus to the information transmitting apparatus is not encrypted. In this case, the another information transmitting apparatus can easily obtain the time-position information indicating the second non-transmission period from the second wireless packet, and can well transmit a wireless packet (information) to the information receiving apparatus during the second non-transmission period.

Also, for example, the time-position information contained in the second wireless packet transmitted from the information receiving apparatus to the information transmitting apparatus is at least encrypted using a cipher mutually authenticated between the another information transmitting apparatus and the information receiving apparatus. This can prevent the time-position information contained in the second wireless packet from being obtained by a malicious information communication apparatus and can enhance resistance to an attack from such a information communication apparatus.

Also, for example, the information receiving apparatus determines when to transmit a wireless packet during the second non-transmission period, using random backoff. In this case, the another information transmitting apparatus also determines when to transmit a wireless packet during the second non-transmission period, using random backoff. This can reduce the probability of collision between the wireless packet from the another information transmitting apparatus to the information transmitting apparatus and the wireless packet from the information receiving apparatus to the another information transmitting apparatus.

For example, the number of second non-transmission periods is used as the unit of a backoff counter. Also, for example, the time position indicated by the time-position information contained in the first wireless packet (the time-position information contained in the second wireless packet) is used as the start point, and a specific time-step size is used as the unit of the backoff counter. This allows backoff control with a time unit finer than the case of using the number of second non-transmission periods as the unit of the backoff counter, enabling effective utilization of wireless resources.

In the invention, for example, when the information receiving apparatus receives the wireless packet from the another information transmitting apparatus containing information notifying the switching to data streaming transmission from the another information transmitting apparatus, the information receiving apparatus transmits the second wireless packet containing a request for interrupting the data streaming transmission to the information transmitting apparatus, and starts the process of interrupting the data streaming transmission.

Then, on completing the process of interrupting the data streaming transmission, the information receiving apparatus transmits a wireless packet containing a notification of allowing the start of data streaming transmission to the another information transmitting apparatus. This well switches from the situation in that data streaming transmission is being performed from the information transmitting apparatus to the information receiving apparatus to the situation in that, after the data streaming transmission is interrupted, data streaming transmission is being performed from the another information transmitting apparatus to the information receiving apparatus.

Advantage of the Invention

According to the invention, when an information transmitting apparatus sequentially transmits a first wireless packet for data streaming transmission with a non-transmission period therebetween to an information receiving apparatus, communication between the information receiving apparatus and another information transmitting apparatus is allowed.

DETAILED DESCRIPTION

Mode for Carrying Out the Invention

The best mode for carrying out the invention (hereinafter referred to as "embodiment") is described below. The description is made in the order below.

1. Embodiment
2. Variation

<1. Embodiment>

[Configuration Example of Information Communication System]

Figure 1:
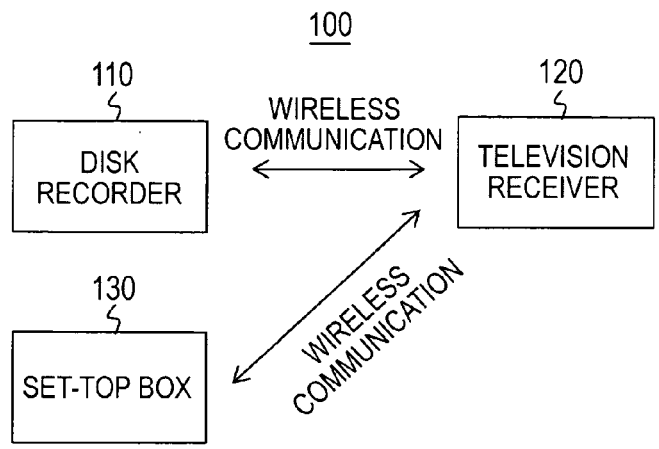
[FIG. 1] It is a block diagram showing a configuration example of an information communication system as an embodiment.

FIG. 1 shows a configuration example of an information communication system 100 in accordance with an embodiment. The information communication system 100 includes a disk recorder 110 as an information transmitting apparatus, a television receiver 120 as an information receiving apparatus, and a set-top box 130 as another information transmitting apparatus.

Wireless communication is performed between the disk recorder 110 and the television receiver 120, and data streaming transmission of audio and video is performed from the disk recorder 110 to the television receiver 120. Also, wireless communication is performed between the set-top box 130 and the television receiver 120, and data streaming transmission of audio and video is performed from the set-top box 130 to the television receiver 120.

Note that the data streaming transmission from the disk recorder 110 to the television receiver 120 and the data streaming transmission from the set-top box 130 to the television receiver 120 are selectively performed. For example, when the data streaming transmission from the disk recorder 110 to the television receiver 120 is being performed, switching to the data streaming transmission from the set-top box 130 to the television receiver 120 can be performed. Switching in the opposite direction can also be performed.

[Configuration Example of Disk Recorder, Television Receiver, and Set-Top Box]

Configuration examples of the disk recorder 110, the television receiver 120, and the set-top box 130 are described.

Figure 2:
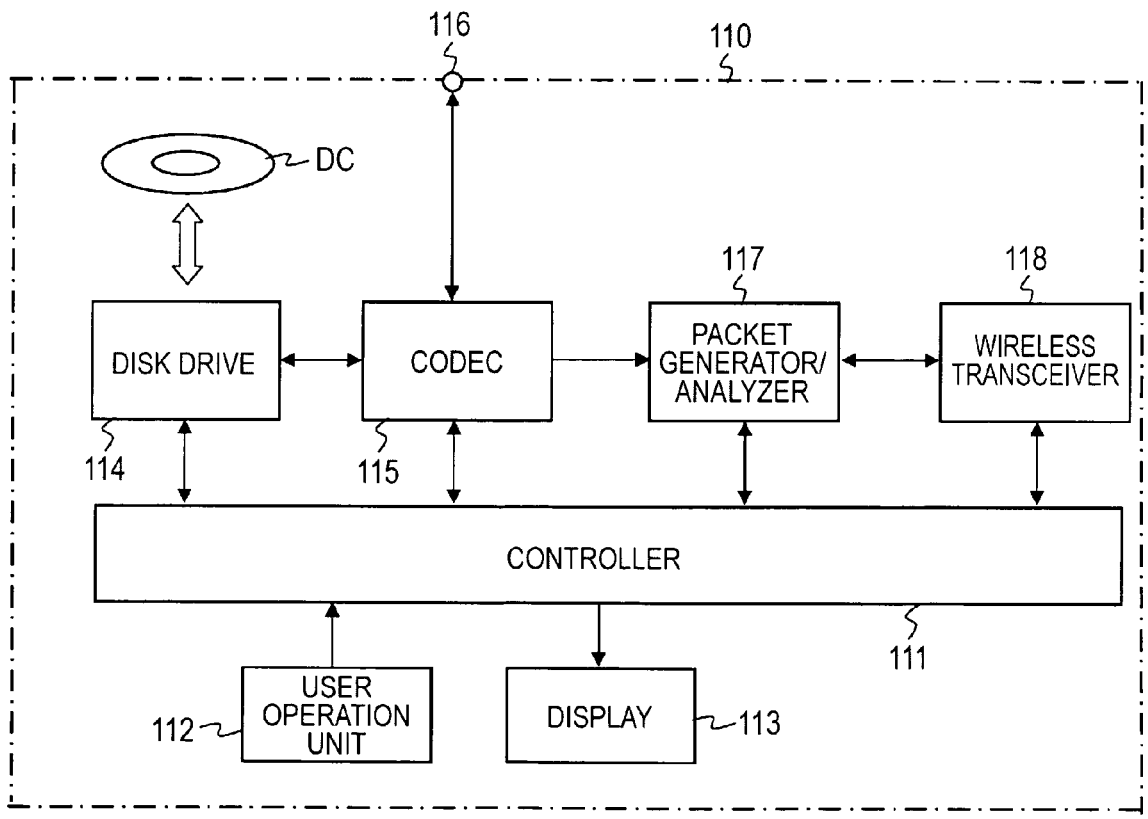
[FIG. 2] It is a block diagram showing a configuration example of a disk recorder as source device (information transmitting apparatus) included in the information communication system.

First, a configuration example of the disk recorder 110 is described. FIG. 2 shows the configuration example of the disk recorder 110. The disk recorder 110 includes a controller 111, a user operation unit 112, a display 113, a disk drive 114, a codec 115, a terminal 116 for connecting to an external device, a packet generator/analyzer 117, and a wireless transceiver 118.

The controller 111 controls operations of various sections of the disk recorder 110. The controller 111 includes a central processing unit (CPU), a read only memory (ROM), and a random access memory (RAM). The ROM stores a control program for the CPU, for example. The RAM is used to temporarily store data necessary for the control processing of the CPU, for example. The CPU reads a program and data from the ROM and expands them on the RAM to start the program and control operations of various sections of the disk recorder 110.

The user operation unit 112 and the display 113 form a user interface and connect to the controller 111. The user operation unit 112 includes a key, button, and dial disposed on the cabinet (not shown) of the disk recorder 110, or a touch panel disposed on the display surface of the display 113, or a remote controller or the like. The display 113 is formed with a liquid crystal display (LCD) or the like.

The disk drive 114 records encoded data, supplied from the codec 115, to a disc-shaped recording medium DC such as Blu-ray Disc (BD) or digital versatile disc (DVD), the encoded data being obtained by encoding image data (video signal) and audio data (audio signal) associated with the image data using, for example, a MPEG (Moving Picture Experts Group) method. Also, the disk drive 114 reproduces (reads) encoded data from the disc-shaped recording medium DC and supplies the data to the codec 115.

The codec 115 decodes the encoded data supplied from the disk drive 114 into baseband (non-compressed) image and audio data using, for example, the MPEG method. Then, the codec 115 supplies the baseband image and audio data to the packet generator/analyzer 117 while outputting them to the terminal 116. Also, the codec 115 encodes baseband image and audio data input to the terminal 116 from an external device not shown into encoded data and supplies the encoded data to the disk drive 114. The external device may be a hard-disk recorder (HDD recorder), a personal computer, a DVD recorder or a video camera.

The packet generator/analyzer 117 generates a wireless packet for data streaming transmission or a wireless packet for control information transmission. The wireless packet for data streaming transmission contains the image and audio data supplied from the codec 115 as streaming data while containing various control information supplied from the controller 111. One wireless packet for data streaming transmission contains one frame of image and audio data, for example.

The wireless packet for control information transmission contains various control information supplied from the controller 111. Also, the packet generator/analyzer 117 analyzes a wireless packet for control information transmission transmitted by the television receiver 120 and supplied from the wireless transceiver 118 to extract various control information and supplies the various control information to the controller 111.

The wireless transceiver 118 wirelessly transmits the wireless packet generated by the packet generator/analyzer 117 to the television receiver 120. Also, the wireless transceiver 118 receives the wireless packet for control information transmission transmitted by the television receiver 120 and supplies it to the packet generator/analyzer 117.

Figure 3:
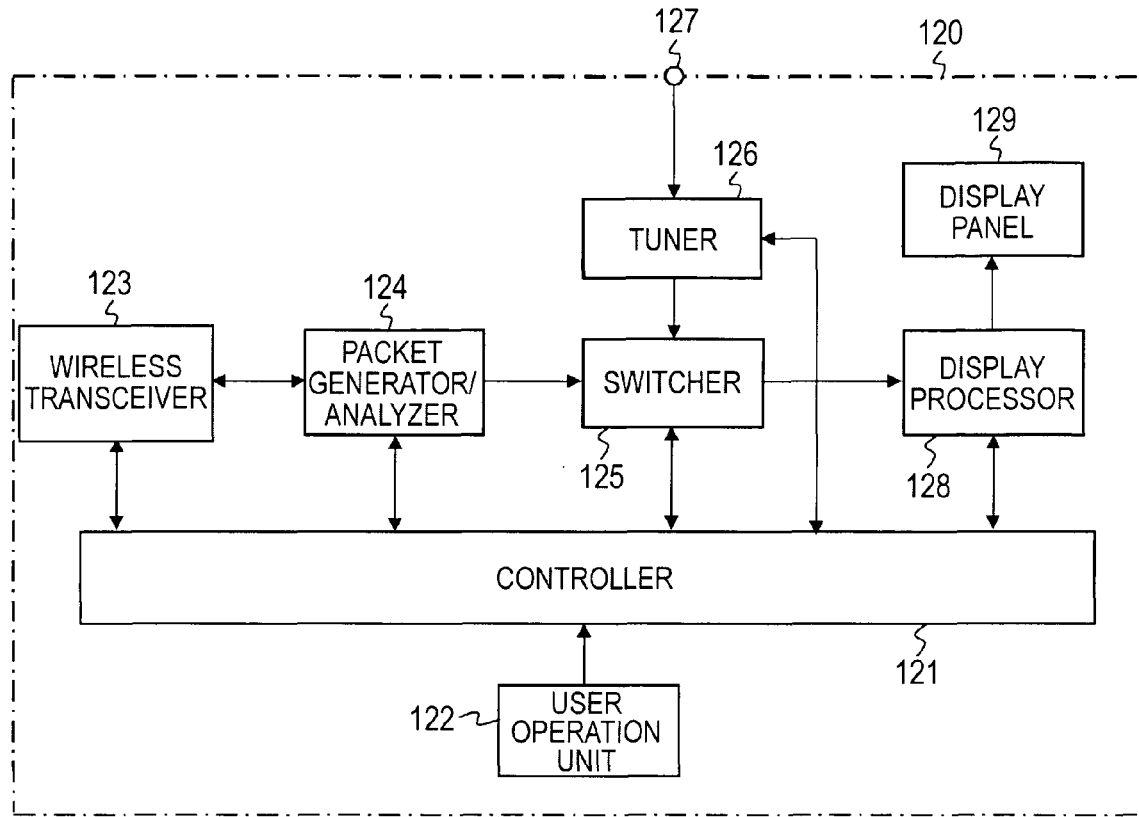
[FIG. 3] It is a block diagram showing a configuration example of a television receiver as sink device (information receiving apparatus) included in the information communication system.

Next, a configuration example of the television receiver 120 is described. FIG. 3 shows the configuration example of the television receiver 120. The television receiver 120 includes a controller 121 and a user operation unit 122. Also, the television receiver 120 includes a wireless transceiver 123, a packet generator/analyzer 124, a switcher 125, a tuner 126, an antenna terminal 127, a display processor 128, and a display panel 129.

The controller 121 controls operations of various sections of the television receiver 120. The controller 121 includes a CPU, a ROM, and a RAM. The ROM stores a control program for the CPU, for example. The RAM is used to temporarily store data necessary for the control processing of the CPU, for example. The CPU reads a program and data from the ROM and expands them on the RAM to start the program and control operations of various sections of the television receiver 120. The user operation unit 122 includes a key, button, and dial disposed on the cabinet (not shown) of the television receiver 120, or a remote controller or the like.

The wireless transceiver 123 receives a wireless packet for data streaming transmission and the like transmitted from the disk recorder 110 or the set-top box 130 and supplies it to the packet generator/analyzer 124. Also, the wireless transceiver 123 wirelessly transmits the wireless packet generated by the packet generator/analyzer 124 to the disk recorder 110 or the set-top box 130.

The packet generator/analyzer 124 generates a wireless packet for control information transmission containing various control information supplied from the controller 121. Also, the packet generator/analyzer 124 analyzes the wireless packet transmitted by the disk recorder 110 or the set-top box 130 and supplied from the wireless transceiver 123, and extracts image and audio data, and various control information. The packet generator/analyzer 124 supplies the extracted various control information to the controller 121.

The tuner 126 receives BS broadcasting, terrestrial digital broadcasting and the like. The tuner 126 is supplied with a broadcast signal caught by an antenna (not shown) connected to the antenna terminal 127. The tuner 126 obtains image and audio data of a predetermined program based on the broadcast signal. The switcher 125 selectively derives the image and audio data extracted by the packet generator/analyzer 124 or the image and audio data obtained by the tuner 126.

The display processor 128 performs processing, such as color correction, edge enhancement, or superimposition of graphics data, on the image data derived by the switcher 125. The display panel 129 displays an image based on the image data processed by the display processor 128. The display panel 129 may be formed with a liquid crystal display (LCD), an organic electro-luminescence (EL) or a plasma display panel (PDP). Although not shown, the audio data derived by the switcher 125 is supplied to a speaker via an amplifier.

Figure 4:
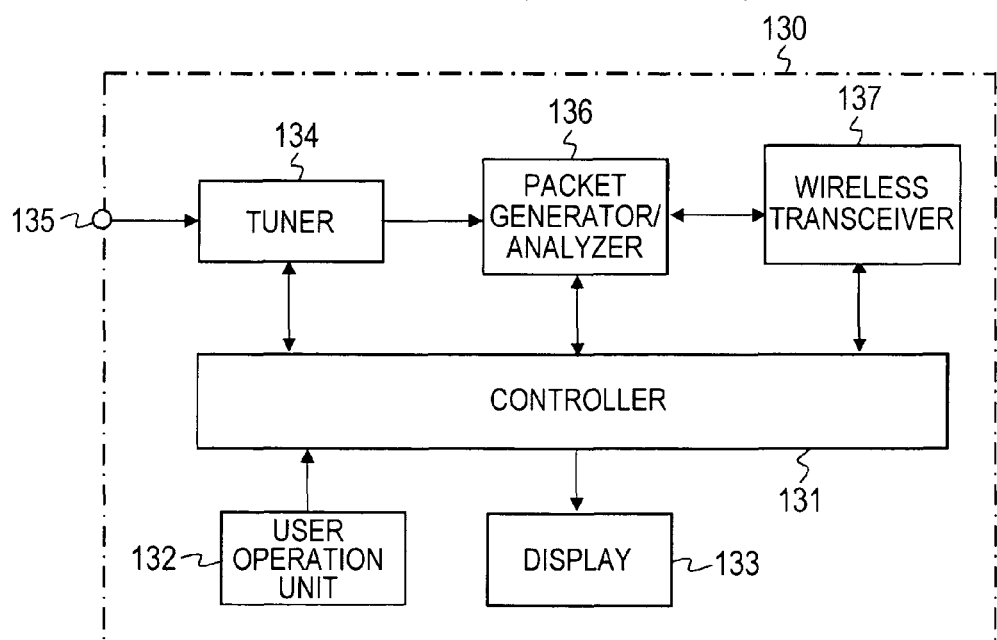
[FIG. 4] It is a block diagram showing a configuration example of a set-top box as source device (information transmitting apparatus) included in the information communication system.

Next, a configuration example of the set-top box 130 is described. FIG. 4 shows a configuration example of the set-top box 130. The set-top box 130 includes a controller 131, a user operation unit 132, a display 133, a tuner 134, an antenna terminal 135, a packet generator/analyzer 136 and a wireless transceiver 137.

The controller 131 controls operations of various sections of the set-top box 130. The controller 131 includes a CPU, a ROM, and a RAM. The ROM stores a control program for the CPU, for example. The RAM is used to temporarily store data necessary for the control processing of the CPU, for example. The CPU reads a program and data from the ROM and expands them on the RAM to start the program and control operations of various sections of the set-top box 130.

The user operation unit 132 and the display 133 form a user interface and connect to the controller 131. The user operation unit 132 includes a key, button, and dial disposed on the cabinet (not shown) of the set-top box 130, or a touch panel disposed on the display surface of the display 133, or a remote controller or the like. The display 133 maybe formed with an LCD or the like.

The tuner 134 receives BS broadcasting, terrestrial digital broadcasting and the like. The tuner 134 is supplied with a broadcast signal caught by an antenna (not shown) connected to the antenna terminal 135. The tuner 134 obtains image and audio data of a predetermined program based on the broadcast signal.

The packet generator/analyzer 136 generates a wireless packet for data streaming transmission or a wireless packet for control information transmission. The wireless packet for data streaming transmission contains the image and audio data obtained by the tuner 134 as streaming data while containing various control information supplied from the controller 131. One wireless packet for data streaming transmission contains one frame of image and audio data, for example.

The wireless packet for control information transmission contains various control information supplied from the controller 131. Also, the packet generator/analyzer 136 analyzes a wireless packet for control information transmission transmitted by the television receiver 120 and supplied from the wireless transceiver 137 to extract various control information and supplies the various control information to the controller 131.

The wireless transceiver 137 wirelessly transmits the wireless packet generated by the packet generator/analyzer 136 to the television receiver 120. Also, the wireless transceiver 137 receives the wireless packet for control information transmission transmitted by the television receiver 120 and supplies it to the packet generator/analyzer 136.

[Operation Example in Data Streaming Transmission]

Operation examples of the information communication system 100 (shown in FIG. 1) in data streaming transmission is described.

First, an operation example in data streaming transmission from the disk recorder 110 to the television receiver 120 is described. When a user operates the disk recorder 110 to transmit image and audio data recorded in the disc-shaped recording medium DC, the disk drive 114 reproduces the encoded data from the disc-shaped recording medium DC. This reproduced data is supplied to the codec 115.

The codec 115 decodes the encoded data reproduced by the disk drive 114 into baseband image and audio data. This baseband image and audio data is supplied to the packet generator/analyzer 117. The packet generator/analyzer 117 generates a wireless packet for data streaming transmission containing the image and audio data supplied from the codec 115 as streaming data while containing various control information supplied from the controller 111. As described above, one wireless packet for data streaming transmission contains one frame of image and audio data, for example.

The wireless packet for data streaming transmission generated by the packet generator/analyzer 117 is wirelessly transmitted from the wireless transceiver 118 to the television receiver 120. In this situation, from the disk recorder 110 to the television receiver 120, a wireless packet PK1 for data streaming transmission is sequentially transmitted with a non-transmission period therebetween, as shown in FIG. 5(a). This wireless packet PK1 contains streaming data of audio and video as well as various control information.

In the television receiver 120, the wireless transceiver 123 receives the wireless packet for data streaming transmission transmitted by the disk recorder 110. This wireless packet is supplied to the packet generator/analyzer 124. The packet generator/analyzer 124 analyzes the wireless packet, and extracts image and audio data, and various control information. The various control information is supplied to the controller 121.

The image data extracted by the packet generator/analyzer 124 is supplied to the display processor 128 via the switcher 125. Under the control of the controller 121, the display processor 128 performs processing, such as color correction, edge enhancement, or superimposition of graphics data, on the image data. Then, the display panel 129 displays an image (reproduced image) based on the image data supplied from the display processor 128. Although not shown, the audio data extracted by the packet generator/analyzer 124 is supplied to the speaker via the switcher 125 and the amplifier. The speaker outputs audio (reproduced audio) based on the audio data.

Also, in the television receiver 120, the wireless packet for control information transmission is generated according to the various control information extracted from the wireless packet PK1 as described above, and is wirelessly transmitted to the disk recorder 110. Specifically, the packet generator/analyzer 124 generates the wireless packet for control information transmission containing various control information, such as ACK (ACKnowledgement) supplied from the controller 121. This wireless packet is wirelessly transmitted from the wireless transceiver 123 to the disk recorder 110.

As described above, from the disk recorder 110 to the television receiver 120, the wireless packet for data streaming transmission is sequentially transmitted with the non-transmission period therebetween. In other words, this wireless packet for data streaming transmission is intermittently transmitted with the non-transmission period therebetween from the disk recorder 110 to the television receiver 120.

Here, a predetermined proportion of non-transmission periods are assigned to the transmission from the television receiver 120 to the disk recorder 110 based on, for example, the control information contained in the immediately preceding wireless packet. A non-transmission period that is thus assigned to the transmission from the television receiver 120 to the disk recorder 110 is appropriately referred to as "a first non-transmission period." On the other hand, a non-transmission period that is not assigned to the transmission from the television receiver 120 to the disk recorder 110 is appropriately referred to as "a second non-transmission period."

As described above, in the television receiver 120, the wireless packet PK2 for control information transmission transmitted from the wireless transceiver 123 to the disk recorder 110 is transmitted during the first non-transmission period, as shown in FIG. 5(b).

In the disk recorder 110, the wireless transceiver 118 receives the wireless packet for control information transmission transmitted by the television receiver 120. This wireless packet is supplied to the packet generator/analyzer 117. The packet generator/analyzer 117 analyzes the wireless packet, and extracts various control information such as ACK. The various control information is supplied to the controller 111.

Next, an operation example in data streaming transmission from the set-top box 130 to the television receiver 120 is described. When the user operates the set-top box 130 to transmit image and audio data obtained by the tuner 134, the packet generator/analyzer 136 generates the wireless packet for data streaming transmission. This wireless packet contains the image and audio data supplied from the tuner 134 as streaming data while containing various control information supplied from the controller 131. As described above, one wireless packet for data streaming transmission contains one frame of image and audio data, for example.

Figure 5:
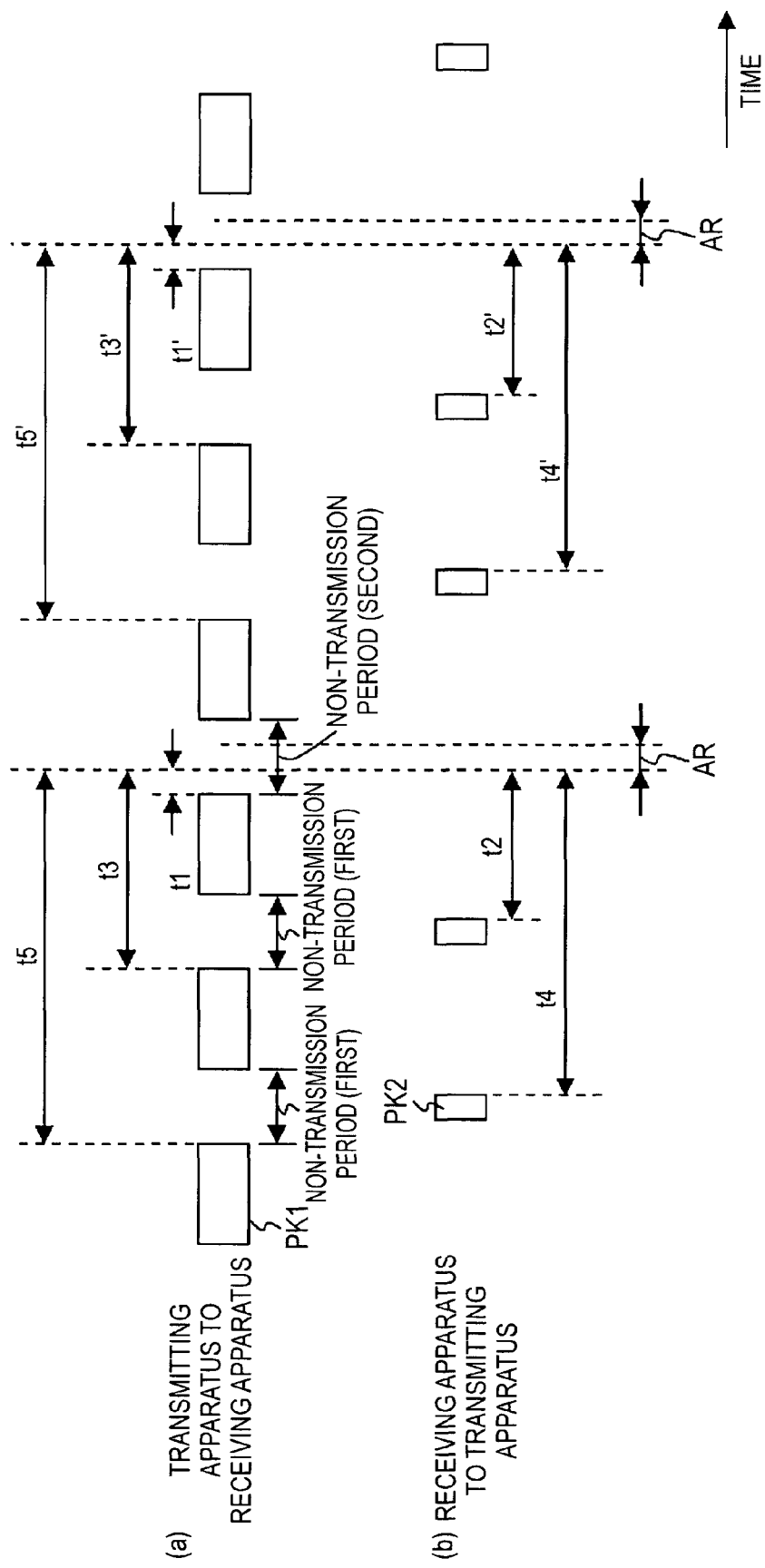
[FIG. 5] It is a diagram showing a wireless packet for data streaming transmission transmitted from the transmitting apparatus to the receiving apparatus and a wireless packet for control information transmission transmitted from the receiving apparatus to the transmitting apparatus in the data streaming transmission.

The wireless packet for data streaming transmission generated by the packet generator/analyzer 136 is wirelessly transmitted from the wireless transceiver 137 to the television receiver 120. In this situation, from the set-top box 130 to the television receiver 120, a wireless packet PK1 for data streaming transmission is sequentially transmitted with a non-transmission period therebetween, as shown in FIG. 5(*a*). This wireless packet PK1 contains streaming data of audio and video as well as various control information.

In the television receiver 120, the wireless transceiver 123 receives the wireless packet for data streaming transmission transmitted by the set-top box 130. This wireless packet is supplied to the packet generator/analyzer 124. The packet generator/analyzer 124 analyzes the wireless packet, and extracts image and audio data, and various control information. The various control information is supplied to the controller 121.

The image data extracted by the packet generator/analyzer 124 is supplied to the display processor 128 via the switcher 125. Under the control of the controller 121, the display processor 128 performs processing, such as color correction, edge enhancement, or superimposition of graphics data, on the image data. Then, the display panel 129 displays an image (image received from STB) based on the image data supplied from the display processor 128. Although not shown, the audio data extracted by the packet generator/analyzer 124 is supplied to the speaker via the switcher 125 and the amplifier. The speaker outputs audio (audio received from STB) based on the audio data.

Also, in the television receiver 120, the packet generator/analyzer 124 generates the wireless packet for control information transmission containing various control information, such as ACK supplied from the controller 121. This wireless packet is wirelessly transmitted from the wireless transceiver 123 to the set-top box 130. In this situation, from the television receiver 120 to the set-top box 130, a wireless packet PK2 for control information transmission is transmitted during the first non-transmission period, as shown in FIG. 5(*b*).

In the set-top box 130, the wireless transceiver 137 receives the wireless packet for control information transmission transmitted by the television receiver 120. This wireless packet is supplied to the packet generator/analyzer 136. The packet generator/analyzer 136 analyzes the wireless packet, and extracts various control information such as ACK. The various control information is supplied to the controller 131.

[Configuration Example of Wireless Packet]

Next, configuration examples of the wireless packet that is communicated between the source device (disk recorder 110, set-top box 130) and the sink device (television receiver 120) in data streaming transmission is described.

Figure 6:
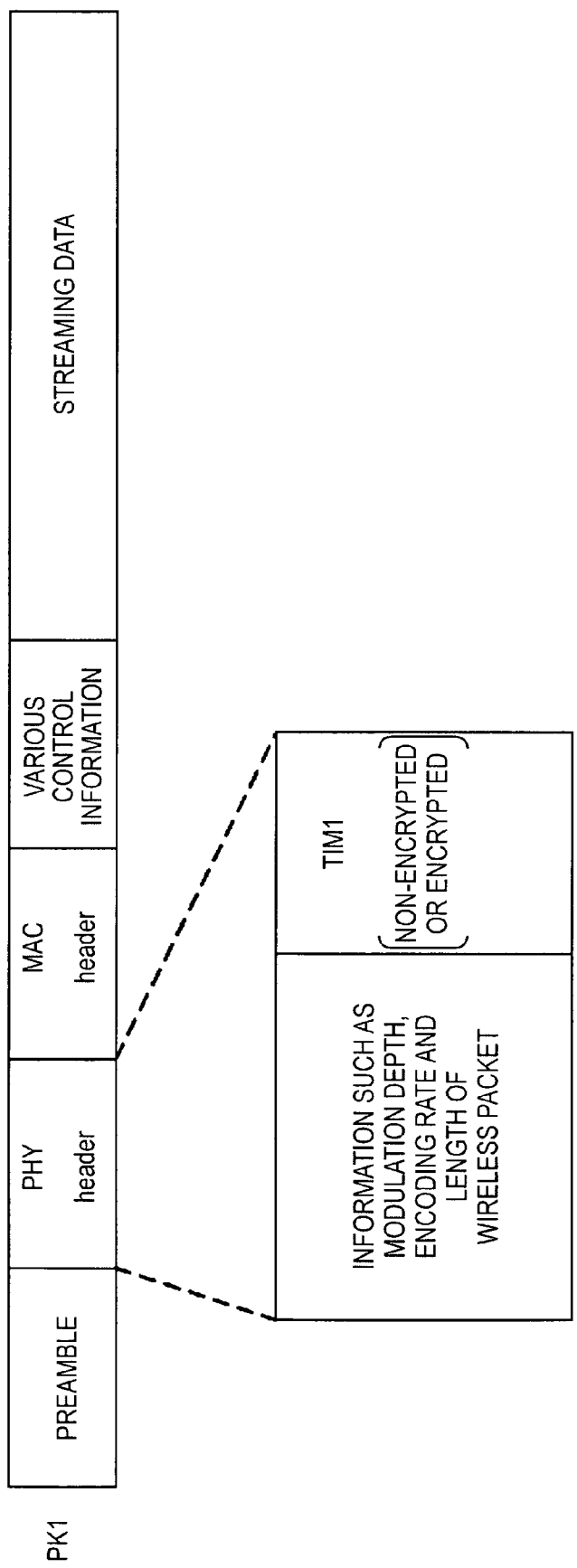
[FIG. 6] It is a diagram showing a configuration example of the wireless packet PK1 for data streaming transmission transmitted from the source device to the sink device.

First, a configuration example of the wireless packet PK1 for data streaming transmission transmitted from the source device to the sink device is described. FIG. 6 shows an example of the format of the wireless packet PK1. The wireless packet PK1 includes a preamble, a PHY header, a MAC header, various control information and streaming data.

The preamble is a known pattern to be used for detecting a wireless packet, estimating a carrier frequency error, correcting a timing error, estimating a transmission path and the like on the receiving side. The PHY header contains information such as modulation depth, encoding rate of error correcting code and packet length to be used in the MAC header and rest of the wireless packet. The MAC header contains a transmitting station address, a receiving station address, an information element contained in the wireless packet, the type of the packet and the like. The various control information includes information on what a wireless communication station to be the receiving station (information receiving apparatus) needs to do after receiving this wireless packet, for example, the information that the station needs to transmit an ACK. Also, the various control information includes response information to the wireless communication station to be the receiving station (information receiving apparatus), for example, the information that a request for interrupting data streaming transmission has been accepted.

In this embodiment, as shown in FIG. 6, the PHY header of the wireless packet PK1 contains time-position information TIM1 indicating a second non-transmission period, in addition to the information such as modulation depth, encoding rate of error correcting code and packet length described above. The second non-transmission period is a non-transmission period that is not assigned to the transmission from the sink device to the source device, as described above. For example, the time-position information TIM1 corresponds to a period of time from the ending time of the wireless packet PK1 as the starting point to the starting time of the second non-transmission period (see time t5, t3, t1, t5', t3', t1' in FIG. 5(*a*)). In the example shown in FIG. 5, an interval AR is provided within the second non-transmission period, and the starting time of the interval AR is set to the starting time of the second non-transmission period.

In the wireless packet PK1 shown in FIG. 6, the preamble, PHY header, MAC header and so on, other than the time-position information TIM1 contained in the PHY header, have nothing to do with the essence of the invention and is not so different from the standard of wireless LAN such as IEEE802.11.

Figure 7:
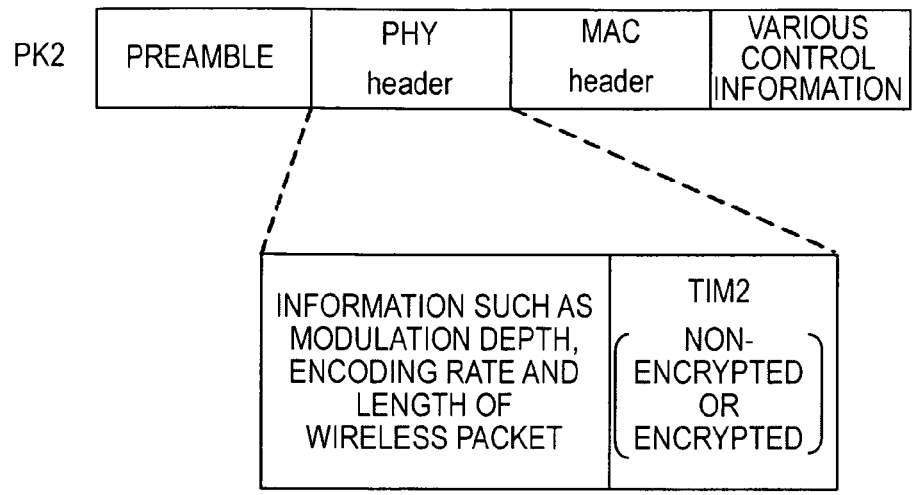
[FIG. 7] It is a diagram showing a configuration example of the wireless packet PK2 for control information transmission transmitted from the sink device to the source device.

Next, a configuration example of the wireless packet PK2 for control information transmission transmitted from the sink device to the source device is described. FIG. 7 shows an example of the format of the wireless packet PK2. The wireless packet PK2 includes a preamble, a PHY header, a MAC header and various control information.

The preamble is a known pattern to be used for detecting a wireless packet, estimating a carrier frequency error, correcting a timing error, estimating a transmission path and the like. The PHY header contains information such as modulation depth, encoding rate of error correcting code and packet length to be used in the MAC header and rest of the wireless packet. The MAC header contains a transmitting station address, a receiving station address, an information element contained in the wireless packet, the type of the packet and the like. The various control information includes information on what a wireless communication station to be the receiving station (information transmitting apparatus) needs to do after receiving this wireless packet, for example, the information that it is recommended to decrease transmission speed of the successive wireless packets by thinning out the streaming data because of poor quality of the transmission signal. Also, the various control information includes instruction information to the wireless communication station to be the receiving station (information transmitting apparatus), for example, the information instructing the interruption of data streaming transmission.

In this embodiment, as shown in FIG. 7, the PHY header of the wireless packet PK2 contains time-position information TIM2 indicating a second non-transmission period, in addition to the information such as modulation depth, encoding rate of error correcting code and packet length described above. The time-position information TIM2 is similar to the time-position information TIM1 described above, contained in the PHY header of the wireless packet PK1. Specifically, the time-position information TIM2 corresponds to a period of time from the ending time of the wireless packet PK2 as the starting point to the starting time of the second non-transmission period (the starting time of the interval AR) (see time t4, t2, t4', t2' in FIG. 5(b)).

Figure 8:
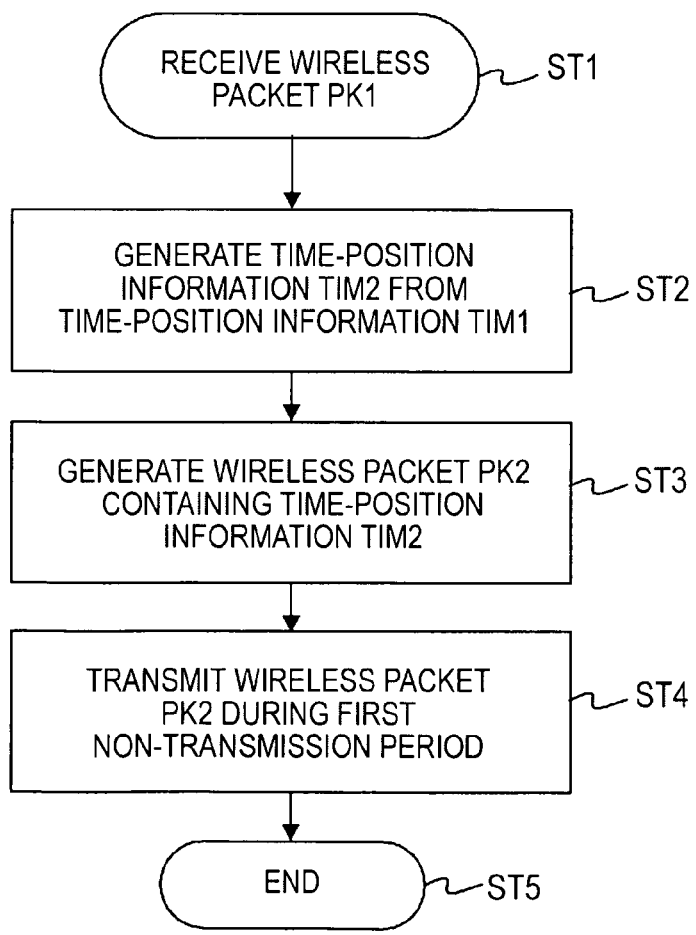
[FIG. 8] It is a flowchart showing a control process performed by the controller of the sink device (television receiver) each time the wireless packet PK1 is received.

In order to cause the time-position information TIM2 to be contained in the PHY header of the wireless packet PK2 as the above, the controller 121 of the sink device (television receiver 120) performs control process according to a flowchart shown in FIG. 8 each time the wireless transceiver 123 receives the wireless packet PK1.

In step ST1, when the wireless transceiver 123 receives the wireless packet PK1, the controller 121 starts the control process and then proceeds to step ST2. In step ST2, the controller 121 generates the time-position information TIM2 based on the time-position information TIM1 contained in the PHY header of the wireless packet PK1. In this situation, the time-position information TIM2 indicates the same non-transmission period (starting time of the non-transmission period) that the time-position information TIM1 indicates.

Then in step ST3, the controller 121 generates the wireless packet PK2 for control information transmission that contains the time-position information TIM2 generated in step ST2 in the PHY header (see FIG. 7). Then, the controller 121, in step ST4, transmits the wireless packet PK2 generated in step ST3 to the source device (disk recorder 110, set-top box 130) during the first non-transmission period, and in step ST5, completes the series of control process.

Figure 9:
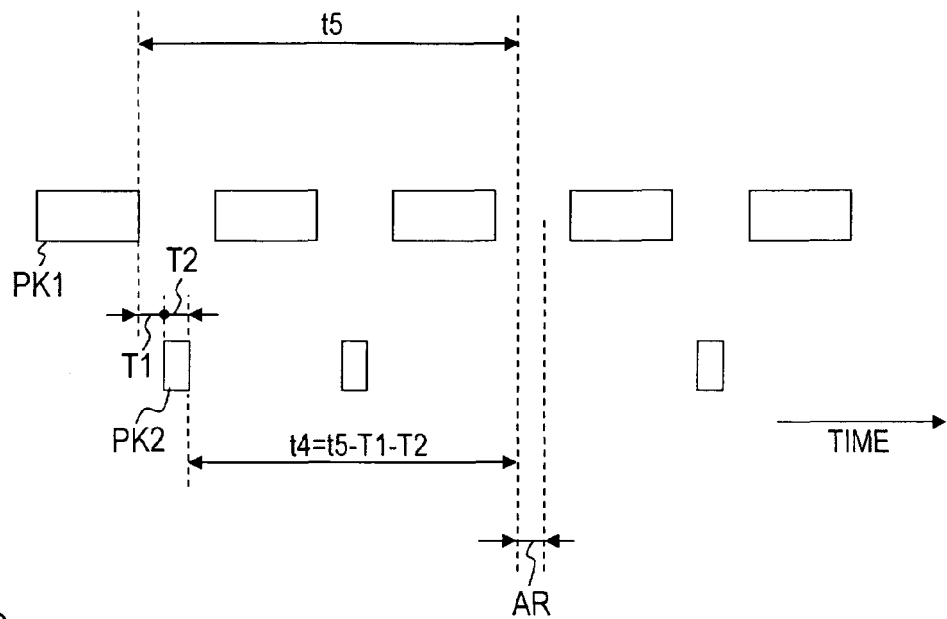
[FIG. 9] It is a diagram for explaining how to determine the time indicated by the time-position information TIM2 contained in the wireless packet PK2 for control information transmission transmitted from the receiving apparatus to the transmitting apparatus.

In the above-described step ST2 in the flowchart of FIG. 8, the controller 121 needs to determine the time indicated by the time-position information TIM2. How to determine the time is described with reference to FIG. 9. In this example, time t5 is indicated by the time-position information TIM1 contained in the PHY header of the wireless packet PK1, and time t4 indicated by the, time-position information TIM2 is determined from the time t5.

The controller 121 knows the time length T1 from the ending time of the wireless packet PK1 to the starting time of the wireless packet PK2 transmitted by the controller 121, and the time length T2 of the wireless packet PK2 transmitted by the controller 121. Accordingly, using the time t5 indicated by the time-position information TIM1 and times T1, T2, the controller 121 can determine the time t4 from the equation t4=t5−T1−T2.

In the above description, the time-position information TIM1, TIM2 contained in the PHY headers of the wireless packets PK1, PK2 correspond to the remaining time from the ending time of the wireless packet as the starting point to the starting time of the second non-transmission period. However, the time-position information TIM1, TIM2 may indicate the absolute time of the starting time of the second non-transmission period.

In this case, the source device (disk recorder 110, set-top box 130) and the sink device (television receiver 120) need to have a timepiece means for generating common time information. Also, in this case, the time-position information TIM1 contained in the PHY header of the wireless packet PK1 is the same information as the time-position information TIM2 contained in the PHY header of the wireless packet PK2. Accordingly, the sink device (television receiver 120) can cause the time-position information TIM1 extracted from the PHY header of the wireless packet PK1 transmitted by the source device to be directly contained in the PHY header of the wireless packet PK2 as the time-position information TIM2.

Also in the above description, the PHY headers of the wireless packets PK1, PK2 contain the time-position information TIM1, TIM2. However, the locations of the time-position information TIM1, TIM2 in the wireless packets PK1, PK2 are not limited to within the PHY headers, but may be within other portions such as the MAC headers.

Also in the above description, the time-position information TIM1, TIM2 correspond to a period of time from the ending time of the wireless packets PK1, PK2 as the starting points to the starting time of the second non-transmission period (the starting time of the interval AR). However, the starting point is not limited to the ending time of the wireless packets PK1, PK2, but may be other time point such as the starting time of the wireless packets PK1, PK2.

Also in the above description, the format of the wireless packet PK2 for information transmission transmitted by the sink device is formed in the same way as that of the wireless packet PK1 for data streaming transmission transmitted by the source device except the streaming data. However, the format of the wireless packet PK2 is not limited to this, but may be formed in another way.

[Operation of Sink Device During the Second Non-Transmission Period]

Next, the operation of the television receiver 120 (the sink device) during the second non-transmission period is described. As described above, the time position of the second non-transmission period is indicated by the time-position information TIM2 contained in the PHY header of the wireless packet PK1 for control information transmission transmitted to the source device (disk recorder 110, set-top box 130).

During the second non-transmission period, as a rule, the controller 121 of the television receiver 120 causes the wireless transceiver 123 to enter receiving mode. This causes the television receiver 120 to stand by for receiving any wireless packet transmitted from another source device different from the source device currently transmitting the wireless packet PK1 for data streaming transmission.

Also, when transmitting a predetermined information to the another source device is needed, the controller 121 of the television receiver 120 performs control as follows: Under the control of the controller 121, the packet generator/analyzer 124 generates a wireless packet containing the predetermined information, and the wireless transceiver 123 transmits this wireless packet to the another source device during the second non-transmission period. In this situation, the wireless transceiver 123 does not enter the receiving mode even during the second non-transmission period.

Figure 10:
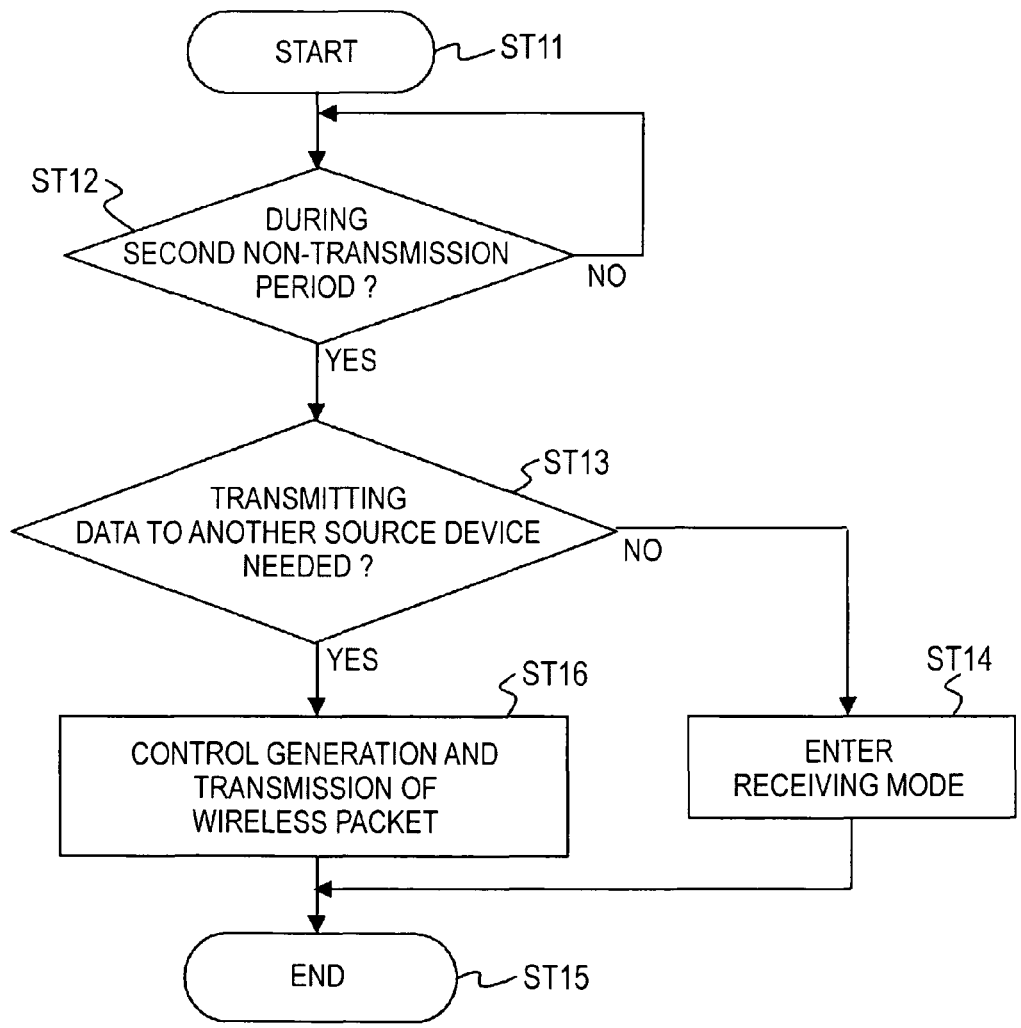
[FIG. 10] It is a flowchart showing a control process performed by the controller of the television receiver during the second non-transmission period.

A flowchart shown in FIG. 10 shows a control process performed by the controller 121 of the television receiver 120 during the second non-transmission period. The controller 121 starts the control process in step ST11, and then proceeds to step ST12. In step ST12, the controller 121 determines whether it is during the second non-transmission period or not. If it is during the second non-transmission period, the controller 121, in step ST13, determines whether transmitting data to the another source device is needed or not.

If the data transmission is not needed, the controller 121, in step ST14, places the wireless transceiver 123 in the receiving mode, and in step ST15, completes the process. On the other hand, if the data transmission is needed, the controller 121 proceeds to step ST16. In step ST16, the controller 121 causes the packet generator/analyzer 124 to generate a wireless packet containing data to be transmitted to the another source device. Also in step ST16, the controller 121 cause the wireless transceiver 123 to transmit the wireless packet generated by the packet generator/analyzer 124 to the another source device during the second non-transmission period. Then in step ST15, the controller 121 completes the process.

[Non-Encryption or Encryption of Time-Position Information]

Next, the encryption of the time-position information TIM1, TIM2 contained in the PHY headers of the wireless packets PK1, PK2 is described.

The time-position information TIM2 contained in the wireless packet PK2 transmitted from the television receiver 120 (sink device) to the source device (disk recorder 110, set-top box 130) may be non-encrypted or encrypted (see FIG. 7).

When the time-position information TIM2 is not encrypted, another source device different from the source device currently transmitting the wireless packet PK1 for data streaming transmission can easily obtain the time-position information TIM2 indicating the second non-transmission period. Accordingly, the another source device can transmit a wireless packet (information) to the television receiver 120 during the second non-transmission period without previously performing mutual authentication or the like with the television receiver 120.

However, if a malicious third party transmits a wireless packet with a wrong value in the PHY header, the operation of the entire information communication system may fail. In order to avoid such a failure, the time-position information TIM2 may be encrypted before being transmitted. In this case, when the television receiver 120 transmits the time-position information TIM2 contained in the PHY header of the wireless packet PK2, mutual authentication needs to have completed and minimum encryption-key information needs to have been shared with the another source device.

When the encrypted time-position information TIM2 is contained in the wireless packet PK2, this time-position information TIM2 is preferably contained in an information field, such as the MAC header, other than the PHY header. More preferably, as an initial mutual authentication information, one domain may be set for all source devices that can be connected, and a key may be defined that enables decryption within the domain. In this case, an implementation may be possible in which a field, such as the MAC header, containing the time-position information TIM2 is encrypted using the key.

In the above, the time-position information TIM2 contained in the wireless packet PK2 transmitted from the television receiver 120 (sink device) to the source device (disk recorder 110, set-top box 130) has been described. Also, the time-position information TIM1 contained in the wireless packet PK1 transmitted from the source device (disk recorder 110, set-top box 130) to the television receiver 120 (sink device) may be non-encrypted or encrypted (see FIG. 6).

When encrypting the time-position information TIM1, it is necessary to use an encryption that can be decrypted at least by the television receiver 120 (sink device). In this case, it is not necessary for the another source device to decrypt this encryption. Because, originally, the source device and the another source device (for example, disk recorder 110 and set-top box 130) do not need direct information exchange therebetween, and they are not assured to receive wireless signal from each other. Also, the television receiver 120 (sink device) transmits the time-position information TIM2 equivalent to the time-position information TIM1, using an encryption decryptable to the another source device.

Assuming that the wireless packet PK1 from the source device can be received by the another source device, one domain maybe set for all wireless communication stations (information transmitting apparatus, information receiving apparatus) that can be connected, and a key may be defined that enables decryption within the domain, as described above. In this case, an implementation may be possible in which a field, such as the MAC header, containing an information element (the time-position information TIM1) is encrypted using the key. This allows the another source device to additionally use information from the source device transmitting the wireless packet PK1. This can decrease the possibility of obtaining a wrong value in comparison with the case of obtaining information only from the television receiver 120 (sink device).

[Preventing Time-Position Change of Second Non-Transmission Period in Source Device]

Next, preventing time-position change of the second non-transmission period in the source device is described. As described above, the source device (disk recorder 110 and set-top box 130) sequentially transmits the wireless packet PK1 for data streaming transmission with the non-transmission period therebetween to the television receiver 120 (sink device). Then, the first non-transmission periods are a predetermined proportion of the non-transmission periods assigned to the transmission from the television receiver 120 to the source devices, and the second non-transmission periods are the rest of the non-transmission periods (see FIG. 5). As described above, the wireless packet PK1 contains the time-position information TIM1 indicating the time position of the second non-transmission period (see FIG. 6).

The length of the wireless packet PK1 varies depending on the resolution of image data included in the streaming data and the like. For example, when the image data changes from HD image data to SD image data, the time length of the wireless packet PK1 decreases. On the other hand, when the image data changes from SD image data to HD image data, the time length of the wireless packet PK1 increases.

The time length of the wireless packet PK1 also varies when the transmittable bit rate of a wireless communication channel varies. For example, when the transmittable bit rate of the wireless communication channel decreases, the time length of the wireless packet PK1 increases. On the other hand, when the transmittable bit rate of the wireless communication channel increases, the time length of the wireless packet PK1 decreases.

When the time length of the wireless packet PK1 varies in this way, the time position indicated by the time-position information TIM1 contained in the wireless packet PK1 may no longer correspond to the actual time position of the second non-transmission period. When the correspondence of the time positions is lost in this way, the communication between the television receiver 120 (sink device) and the another source device performed based on the time-position information as described above may be interfered by the wireless packet PK1 or the like.

Thus, the controller (controller 111, controller 131) of the source device (disk recorder 110, set-top box 130) performs adjustment as follows: When the amount of information to be transmitted for data streaming transmission increases or the transmittable bit rate decreases after the wireless packet PK1 is transmitted, the controller adjust the information to be contained in the wireless packet PK1 so as not to cause the time position of the second non-transmission period to vary. In this case, for example, a transmission bit of low importance is thinned out, or the transmission of a portion of information that is not sensitive to a variation in transmission delay, such as an instruction asking for information on communication quality, is postponed.

On the other hand, when the amount of information to be transmitted for data streaming transmission decreases or the transmittable bit rate increases after the wireless packet PK1 is transmitted, the controller performs adjustment as follows: The controller at least adjusts the information to be contained in the wireless packet PK1 or adjusts the timing of transmitting the wireless packet PK1 so as not to cause the time position of the second non-transmission period to vary. In this case, for example, the redundancy of transmission bits is increased, or a portion of information that is not sensitive to a variation in transmission delay planned to be transmitted by the next wireless packet is contained in the current wireless packet. Also, for example, the timing of transmitting the wireless packet PK1 is kept no change even when the time length of the wireless packet PK1 decreases.

The above-described adjustment performed by the controller of the source device prevents the time position of the second non-transmission period from varying when the amount of information to be transmitted for data streaming transmission increases or the transmittable bit rate decreases, or when the amount of information to be transmitted for data streaming transmission decreases or the transmittable bit rate increases. Thus, the transmission/reception of information between the television receiver 120 (sink device) and the another source device can avoid being interfered by the transmission of the wireless packet PK1.

[Example of Wireless Packet Exchange Between Sink Device and Another Source Device]

Next, one example of exchanging packets between the television receiver 120 (sink device) and the another source device during the second non-transmission period described above is described with reference to FIG. 11. This example assumes that the disk recorder 110 transmits the wireless packet PK1 for data streaming transmission, and the television receiver 120 transmits the wireless packet PK2 for control information transmission during the first non-transmission period. Then, in this example, the set-top box 130 as the another source device directs the television receiver 120 to use the set-top box 130 as an information source for data streaming transmission.

FIG. 11(a) shows wireless packets transmitted by the disk recorder 110. FIG. 11(b) shows wireless packets transmitted by the television receiver 120. FIG. 11(c) shows wireless packets transmitted by the set-top box 130. In FIGS. 11(a) to (c), "To 1" denotes a wireless packet addressed to the disk recorder 110, "To 2" denotes a wireless packet addressed to the television receiver 120, and "To 3" denotes a wireless packet addressed to the set-top box 130.

For example, the set-top box 130 identifies the time position of the second non-transmission period by the time-position information TIM2 contained in the wireless packet PK2 transmitted from the television receiver 120 to the disk recorder 110, and determines when to transmit a wireless packet. Then, the set-top box 130 transmits a wireless packet containing a connection request and authentication information to the television receiver 120 during the second non-transmission period.

The television receiver 120, when in the receiving mode during the second non-transmission period, receives the wireless packet transmitted by the set-top box 130. Then, based on the connection request and authentication information extracted from the wireless packet, the television receiver 120 performs mutual authentication and determines whether the requested connection is to be allowed or not.

If the television receiver 120 completes the mutual authentication with the set-top box 130 and determines to allow the connection, the television receiver 120 transmits a wireless packet containing information on the completed authentication and the allowed connection to the set-top box 130 during the second non-transmission period. During the second non-transmission period, when the set-top box 130 does not transmit a wireless packet, the set-top box 130 enters the receiving mode. In this situation, under the control of the controller 131, the wireless transceiver 137 enters the receiving mode. Thus, the set-top box 130 can receive the wireless packet transmitted by the television receiver 120 during the second non-transmission period as described above.

Then, the set-top box 130 transmits a wireless packet containing a stream information source switching instruction (notification) to the television receiver 120 during the second non-transmission period. The television receiver 120, when in the receiving mode during the second non-transmission period, receives this wireless packet. Then, in response to the stream information source switching instruction contained in the wireless packet received from the set-top box 130, the television receiver 120 generates a wireless packet containing a stream transmission stop instruction (interruption request) and transmits this wireless packet to the disk recorder 110 during the first non-transmission period.

In response to the stream transmission stop instruction (interruption request) contained in the wireless packet transmitted by the television receiver 120, the disk recorder 110 generates a wireless packet containing an acknowledgement response to the stream transmission stop instruction and transmits this wireless packet to the television receiver 120. This completes the process of interrupting the data streaming transmission between the disk recorder 110 and the television receiver 120.

After the completion of the interruption process described above, the television receiver 120 generates a wireless packet containing a stream transmission start instruction (start permission notification) and transmits this wireless packet to the set-top box 130. In response to the stream transmission start instruction contained in this wireless packet, the set-top box 130 generates a wireless packet for data streaming transmission (see FIG. 6) and transmits this wireless packet to the television receiver 120. Then, the data streaming transmission from the set-top box 130 to the television receiver 120 starts.

Figure 11:
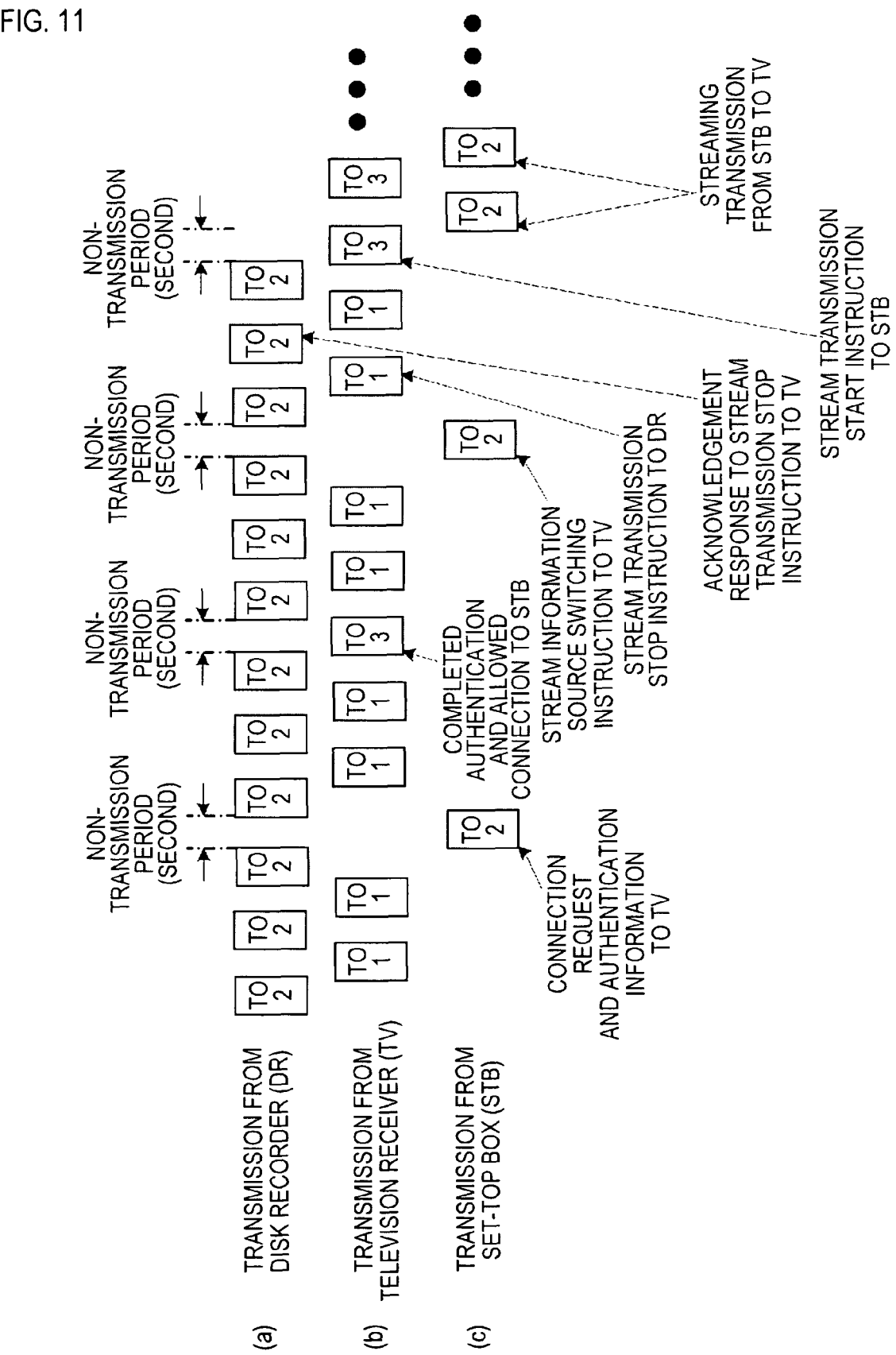
[FIG. 11] It is a diagram showing one example of exchanging packets between the television receiver (sink device) and another source device during the second non-transmission period.

Note that, in FIG. 11, the mutual authentication and the like is completed with one packet. However, in practice, exchanging two or more packets may be needed. Additionally, exchanging ACK or the like may be needed in order to ensure that information is transmitted with no variation in content.

Next, another example of exchanging packets between the television receiver 120 (sink device) and the another source device during the second non-transmission period described above is described with reference to FIG. 12. This example assumes that the disk recorder 110 transmits the wireless packet PK1 for data streaming transmission, and the television receiver 120 transmits the wireless packet PK2 for control information transmission during the first non-transmission period. Then, in this example, the television receiver 120 transmits device control information to the set-top box 130 as the another source device.

For example, the device control information is used in order that the television receiver 120 causes the set-top box 130 to record image and audio data of a program channel specified by the television receiver 120 to an internal storage (not shown in FIG. 4).

FIG. 12(a) shows wireless packets transmitted by the disk recorder 110. FIG. 12(b) shows wireless packets transmitted by the television receiver 120. FIG. 12(c) shows wireless packets transmitted by the set-top box 130. In FIGS. 12(a) to (c), "To 1" denotes a wireless packet addressed to the disk recorder 110, "To 2" denotes a wireless packet addressed to the television receiver 120, and "To 3" denotes a wireless packet addressed to the set-top box 130.

When the device control information needs to be transmitted to the set-top box 130, the television receiver 120 transmits a wireless packet containing a connection request and authentication information to the set-top box 130 during the second non-transmission period. Note that the television receiver 120 knows the time position of the second non-transmission period.

The set-top box 130, when in the receiving mode during the second non-transmission period, receives the wireless packet transmitted by the television receiver 120. Then, based on the connection request and authentication information extracted from the wireless packet, the set-top box 130 performs mutual authentication and determines whether the requested connection is to be allowed or not.

If the set-top box 130 completes the mutual authentication with the television receiver 120 and determines to allow the connection, the set-top box 130 transmits a wireless packet containing information on the completed authentication and the allowed connection to the television receiver 120 during the second non-transmission period. The television receiver 120, when in the receiving mode during the second non-transmission period, receives the wireless packet transmitted by the set-top box 130.

Then, the television receiver 120 generates a wireless packet containing device control instruction information and transmits this wireless packet to the set-top box 130 during the second non-transmission period. The set-top box 130, when in the receiving mode during the second non-transmission period, receives this wireless packet, obtains the device control instruction information, and performs an operation based on the instruction information. Also, when obtaining the device control instruction information, the set-top box 130 generates a wireless packet containing an acknowledgment notification for the device control instruction and transmits this wireless packet to the television receiver 120.

Figure 12:
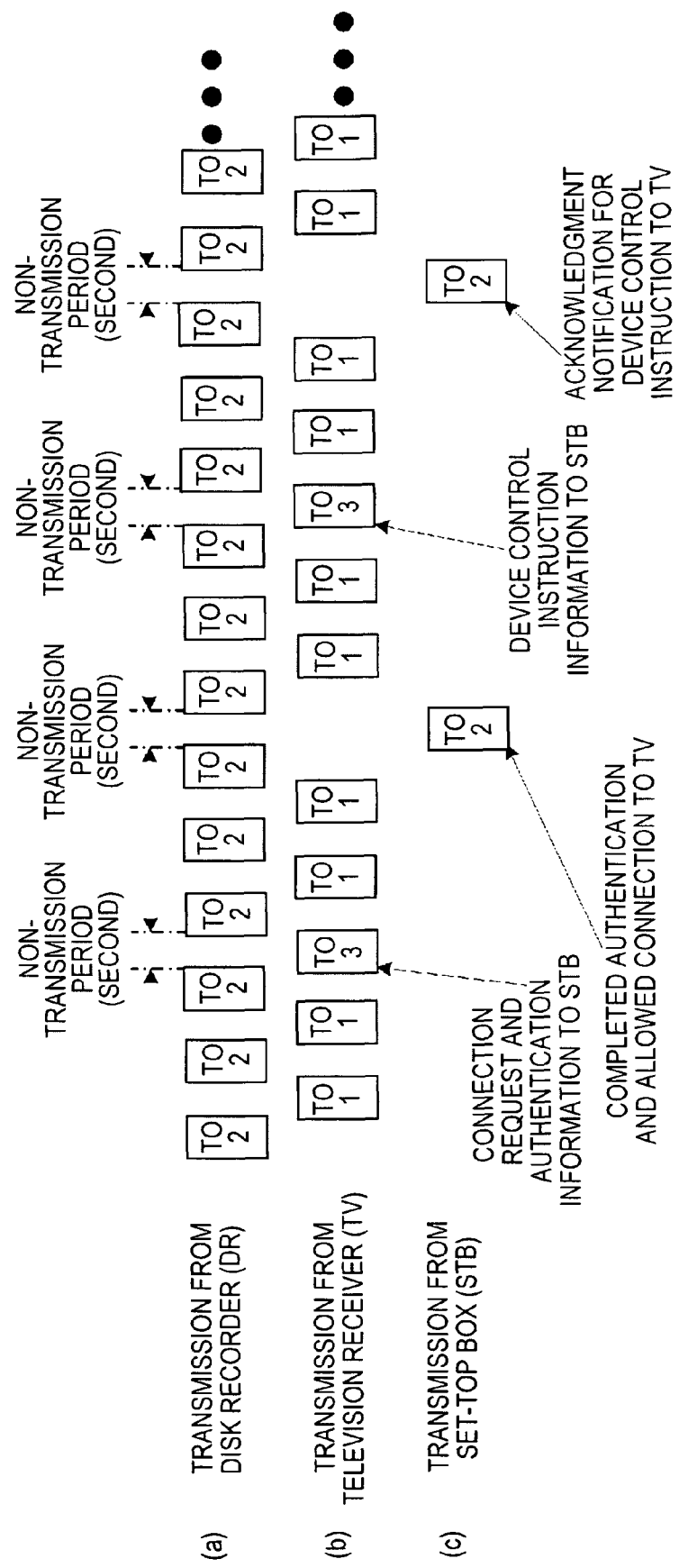
[FIG. 12] It is a diagram showing another example of exchanging packets between the television receiver (sink device) and the another source device during the second non-transmission period.
Figure 13:
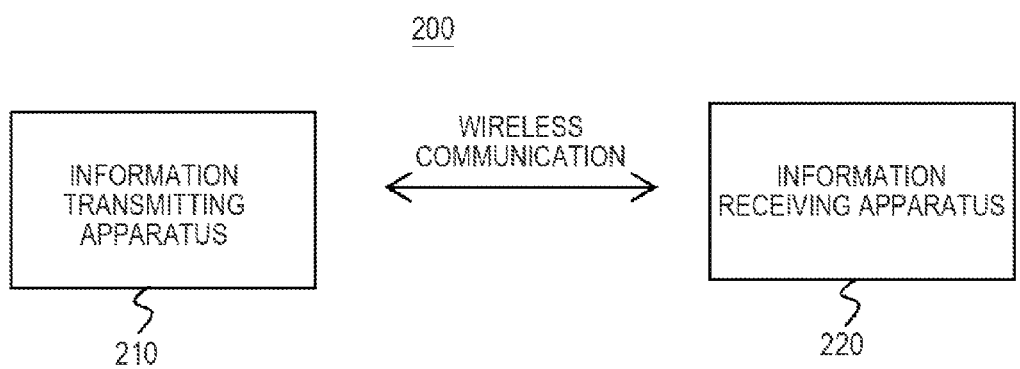
[FIG. 13] It is a block diagram showing a configuration example of a conventional information communication system.
Figure 14:
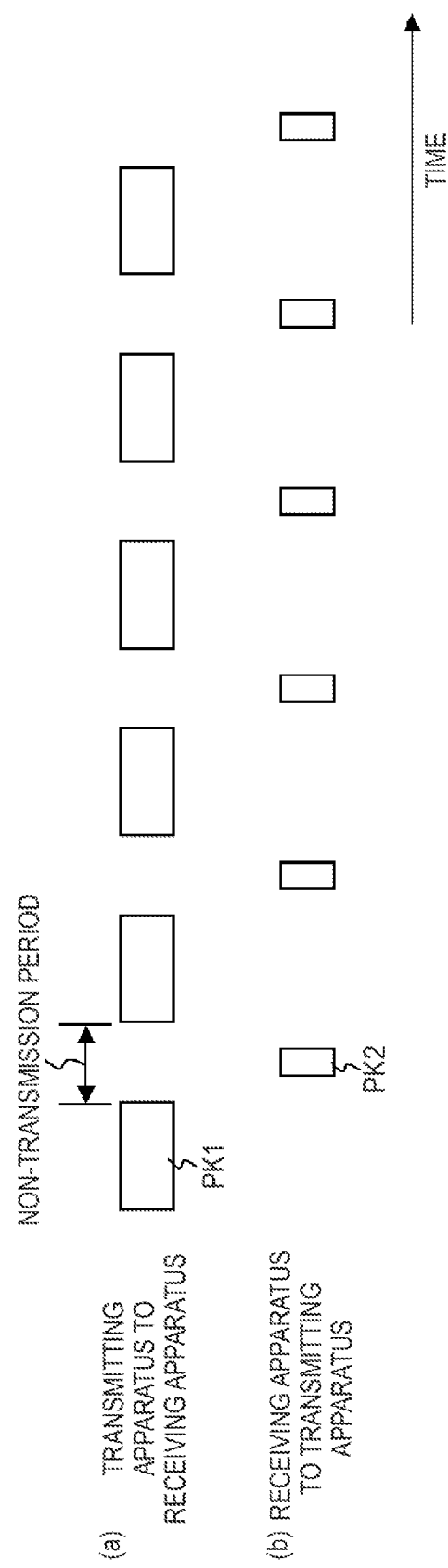
[FIG. 14] It is a diagram showing a wireless packet for data streaming transmission transmitted from the transmitting apparatus to the receiving apparatus and a wireless packet for control information transmission transmitted from the receiving apparatus to the transmitting apparatus in the data streaming transmission.

Note that, in FIG. 12, the mutual authentication and the like is completed with one packet. However, in practice, exchanging two or more packets may be needed. Additionally, exchanging ACK or the like may be needed in order to ensure that information is transmitted with no variation in content.

[Random Backoff]

Next, random backoff for avoiding collision between the wireless packet from the television receiver 120 (sink device) and the wireless packet from the another source device is described. In FIGS. 11 and 12, it seems that the television receiver 120 and the set-top box 130 abruptly use all of the second non-transmission period that is not assigned to the transmission from the television receiver 120 to the disk recorder 110. However, FIGS. 11 and 12 show only examples.

For example, the television receiver 120 may need to transmit information to the set-top box 130 almost at the same time when the set-top box 130 needs to transmit information to the television receiver 120. In addition, another source device other than the disk recorder 110 and the set-top box 130 may exist and need to transmit information to the television receiver 120. Thus, when information needs to be transmitted, an attempt to use the nearest second non-transmission period without thinking may cause collision of wireless packets to fail in transmitting the information.

In this situation, the transmitting side does not receive an ACK from the receiving side, and then tries retransmission which also collides with another transmission. Consequently, both sides continue to fail in transmitting information. In order to avoid this, the wireless communication apparatus (source device, sink device) attempting to perform communication during the second non-transmission period can apply a configuration of determining when to transmit, using random backoff. An example of implementation of random backoff itself can be known from IEEE802.11 and the like, so its detail is not described here.

For example, the number of second transmission periods may be used as the unit of a backoff counter. Also, for example, the time position indicated by the time-position information TIM1, TIM2 contained in the wireless packets PK1, PK2 may be used as the start point, and a specific time-step size may be used as the unit of the backoff counter. This allows backoff control with a time unit finer than the case of using the number of second non-transmission periods as the unit of the backoff counter, enabling effective utilization of wireless resources.

In the information communication system 100 shown in FIG. 1, the second non-transmission period that is not assigned to the transmission from the sink device (television receiver 120) to the source device (disk recorder 110, set-top box 130) exists. Also, the wireless packet PK2 transmitted from the sink device to the source device contains the time-position information TIM2 indicating the time position of the second non-transmission period. Accordingly, during the second non-transmission period, the sink device can transmit/receive information to/from another source device different from the source device transmitting the wireless packet PK1 for data streaming transmission.

This means that the communication between the sink device and the another source device can be performed while data streaming transmission from the source device to the sink device is being performed, which improves user convenience. For example, when a control information notifying the switching of data streaming transmission is transmitted from the another source device to the sink device, the streaming transmission can be switched without causing a user of the sink device to notice the switching of information source of the streaming transmission.

Also, in the information communication system 100 shown in FIG. 1, the time-position information TIM2 indicating the second non-transmission period contained in the wireless packet PK2 addressed from the sink device to the source device can be encrypted, which can be decrypted at least by between the sink device and the another source device. This can enhance resistance to an attack from a malicious wireless communication apparatus.

Also, in the information communication system 100 shown in FIG. 1, the communication between the sink device and the another source device is performed during the second non-transmission period that is not assigned to the transmission from the sink device to the source device. When the wireless packet is transmitted from the sink device to the another source device, or when the wireless packet is transmitted from the another source device to the sink device, when to transmit can be determined using random backoff. This can reduce the collision probability of the wireless packets.

<2. Variation>

In the above-described embodiment, the source devices (information transmitting apparatus) are the disk recorder 110 and the set-top box 130, and the sink device (information receiving apparatus) is the television receiver 120. Of course, the invention can be similarly applied to an information communication system in which the source device and the sink device are a different combination of devices.

Industrial Applicability

The invention can be applied to an information communication system in which a wireless packet for data streaming transmission is sequentially transmitted from a source device to a sink device.

DESCRIPTION OF REFERENCE NUMERALS AND SIGNS 100 information communication system
110 disk recorder
111 controller
112 user operation unit
113 display
114 disk drive
115 codec
116 terminal
117 packet generator/analyzer
118 wireless transceiver
120 television receiver
121 controller
122 user operation unit
123 wireless transceiver
124 packet generator/analyzer
125 switcher
126 tuner
127 antenna terminal
128 display processor
129 display panel
130 set-top box
131 controller
132 user operation unit
133 display
134 tuner
135 antenna terminal
136 packet generator/analyzer
137 wireless transceiver

The invention claimed is:

1. An information receiving apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver receives a first wireless packet for data streaming transmission sequentially transmitted by a first information transmitting apparatus followed by a non-transmission period by the first information transmitting apparatus, the first wireless packet containing time-position information indicating whether or not the non-transmission period that follows is assigned to transmission from the information receiving apparatus to the first information transmitting apparatus, and
wherein the packet generator generates a second wireless packet for control information transmission transmitted to the first information transmitting apparatus by the wireless transceiver, the second wireless packet containing time-position information indicating the same non-transmission period that the time-position information contained in the first wireless packet received by the wireless transceiver indicates.

2. The information receiving apparatus according to claim 1, wherein the controller causes the wireless transceiver to enter receiving mode during the non-transmission period that is not assigned to the transmission from the information receiving apparatus to the first information transmitting apparatus.

3. The information receiving apparatus according to claim 2, wherein, when a predetermined information needs to be transmitted to a second information transmitting apparatus different from the first information transmitting apparatus, the controller causes the packet generator to generate a third wireless packet containing the predetermined information, and causes the wireless transceiver to transmit the third wireless packet generated by the packet generator to the second information transmitting apparatus without entering the receiving mode during the non-transmission period that is not assigned to the transmission from the information receiving apparatus to the first information transmitting apparatus.

4. The information receiving apparatus according to claim 1, wherein the time-position information contained in the second wireless packet generated by the packet generator is not encrypted.

5. The information receiving apparatus according to claim 1, wherein the time-position information contained in the second wireless packet generated by the packet generator is at least encrypted using a cipher mutually authenticated between a second information transmitting apparatus different from the first information transmitting apparatus and the information receiving apparatus.

6. The information receiving apparatus according to claim 1, wherein, when the wireless transceiver receives the third wireless packet from a second information transmitting apparatus different from the first information transmitting apparatus during the non-transmission period predetermined that is not assigned to the transmission from the information receiving apparatus to the first information transmitting apparatus, the controller causes the packet generator to generate a fourth wireless packet containing information needed as a result of receiving the third wireless packet from the second information transmitting apparatus, and causes the wireless transceiver to transmit the fourth wireless packet generated by the packet generator to the second information transmitting apparatus during the non-transmission period that is not assigned to the transmission from the information receiving apparatus to the first information transmitting apparatus, following the predetermined non-transmission period.

7. The information receiving apparatus according to claim 6, wherein, when the third wireless packet from the second information transmitting apparatus contains information notifying the switching to data streaming transmission from the second information transmitting apparatus, the controller causes the packet generator to generate the second wireless packet containing a request for interrupting the data streaming transmission from the first information transmitting apparatus, and causes the wireless transceiver to transmit the second wireless packet generated by the packet generator during the non-transmission period predetermined that is assigned to the transmission from the information receiving apparatus to the first information transmitting apparatus, and after the process of interrupting the data streaming transmission from the first information transmitting apparatus completes, the controller causes the packet generator to generate the fourth wireless packet containing a notification of allowing the start of data streaming transmission from the second information transmitting apparatus, and causes the wireless transceiver to transmit the fourth wireless packet generated by the packet generator to the second information transmitting apparatus.

8. The information receiving apparatus according to claim 1, wherein, when the wireless transceiver transmits a wireless packet to a second information transmitting apparatus different from the first information transmitting apparatus during the non-transmission period predetermined that is not assigned to the transmission from the information receiving apparatus to the first information transmitting apparatus, the controller causes the wireless transceiver to stand by for receiving a response wireless packet from the second information transmitting apparatus during the non-transmission period that is not assigned to the transmission from the information receiving apparatus to the first information transmitting apparatus.

9. The information receiving apparatus according to claim 1, wherein, when causing the wireless transceiver to transmit a wireless packet during the non-transmission period that is not assigned to the transmission from the information receiving apparatus to the first information transmitting apparatus, the controller determines when to transmit, using random backoff.

10. The information receiving apparatus according to claim 9, wherein the controller uses the number of non-transmission periods that are not assigned to the transmission from the information receiving apparatus to the first information transmitting apparatus, as the unit of a backoff counter.

11. The information receiving apparatus according to claim 9, wherein the controller uses the time position indicated by the time-position information contained in the first wireless packet received by the wireless transceiver, as the start point, and uses a specific time-step size as the unit of the backoff counter.

12. An information transmitting apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver transmits the wireless packet for data streaming transmission having a portion containing time-position information indicating that a non-transmission period by the information transmitting apparatus, which follows the transmission of the wireless packet, is one of (i) a first non-transmission period which is a period assigned to transmission from the information receiving apparatus to the information transmitting apparatus and (ii) a second non-transmission period which is a period not assigned to transmission from the information receiving apparatus to the information transmitting apparatus.

13. An information transmitting apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver transmits the wireless packet for data streaming transmission containing time-position information indicating whether or not a non-transmission period by the information transmitting apparatus, which follows the transmission of the wireless packet, is assigned to transmission from the information receiving apparatus to the information transmitting apparatus, and when the wireless transceiver does not transmit a wireless packet generated by the packet generator to the information receiving apparatus, the controller causes the wireless transceiver to enter receiving mode during a predetermined period including a time position indicated by the time-position information contained in the packet from the information receiving apparatus.

14. The information transmitting apparatus according to claim 13, wherein, when the wireless transceiver receives a wireless packet from the information receiving apparatus, the controller causes the packet generator to generate a wireless packet containing information necessary as a result of receiving the wireless packet from the information receiving apparatus, and the controller causes the wireless transceiver to transmit the wireless packet generated by the packet generator to the information receiving apparatus, at the time corresponding to the time position indicated by the time-position information contained in the wireless packet from the information receiving apparatus.

15. An information transmitting apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver transmits the wireless packet for data streaming transmission containing time-position information indicating whether or not a non-transmission period by the information transmitting apparatus, which follows the transmission of the wireless packet, is assigned to transmission from the information receiving apparatus to the information transmitting apparatus, and
when the wireless packet received by the wireless transceiver from the information receiving apparatus contains a notification of allowing data streaming transmission, the controller causes the packet generator to generate a wireless packet for data streaming transmission, and causes the wireless transceiver to sequentially transmit the wireless packet generated by the packet generator to the information receiving apparatus.

16. An information transmitting apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver transmits the wireless packet for data streaming transmission containing time-position information indicating whether or not a non-transmission period by the information transmitting apparatus, which follows the transmission of the wireless packet, is assigned to transmission from the information receiving apparatus to the information transmitting apparatus, and
when a wireless packet is transmitted during a period corresponding to the time position indicated by the time-position information contained in the wireless packet received by the wireless transceiver from the information receiving apparatus, the controller determines when to transmit, using random backoff.

17. The information transmitting apparatus according to claim 16, wherein the controller uses the number of periods corresponding to the time position indicated by the time-position information contained in the wireless packet from the information receiving apparatus, as the unit of a backoff counter.

18. The information transmitting apparatus according to claim 16, wherein the controller uses the time position indicated by the time-position information contained in the wireless packet from the information receiving apparatus, as the start point, and uses a specific time-step size as the unit of the backoff counter.

19. An information transmitting apparatus, comprising:
a wireless transceiver for transmitting and receiving a wireless packet;
a packet generator for generating a wireless packet to be transmitted by the wireless transceiver; and
a controller for controlling the wireless transceiver and the packet generator,
wherein the wireless transceiver transmits the wireless packet for data streaming transmission containing time-position information indicating whether or not a non-transmission period by the information transmitting apparatus, which follows the transmission of the wireless packet, is assigned to transmission from the information receiving apparatus to the information transmitting apparatus, and
when the amount of information to be transmitted for the data streaming transmission increases or the transmittable bit rate decreases after the wireless packet containing the time-position information is transmitted by the wireless transceiver, the controller adjust the information to be contained in the wireless packet generated by the packet generator so as not to cause the time position of the non-transmission period that is not assigned to the transmission from the information receiving apparatus to the information transmitting apparatus to vary.

* * * * *